Nov. 6, 1934.  W. C. SCHOFIELD  1,980,003
LOCKING CAP
Filed May 19, 1933
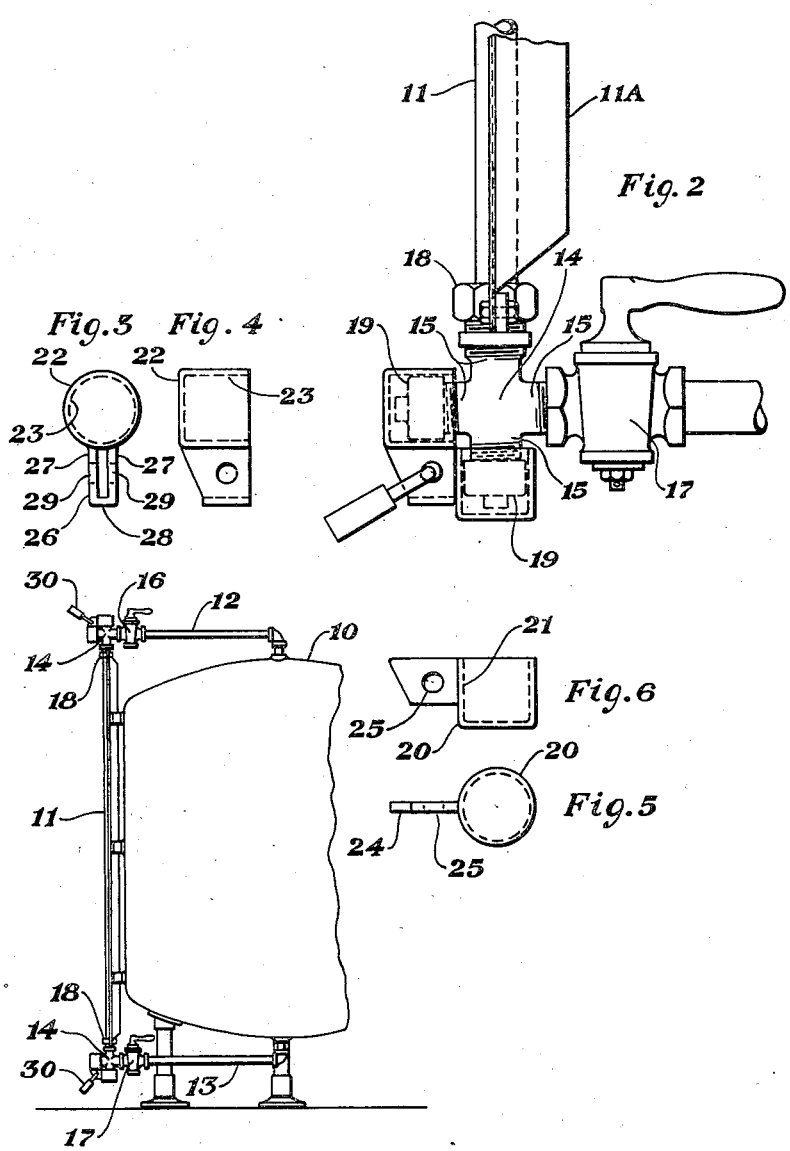
Inventor
Wilfred C. Schofield
By Wilkinson, Huxley, Byron & Knight
Attys.

Patented Nov. 6, 1934

1,980,003

UNITED STATES PATENT OFFICE 1,980,003

LOCKING CAP

Wilfred C. Schofield, Chicago, Ill., assignor to Freyn Engineering Company, Chicago, Ill., a corporation of Maine Application May 19, 1933, Serial No. 671,872

4 Claims. (Cl. 70—122)

The present invention relates to locking caps.

More particularly the present invention relates to locking devices for use on the two outlets of a pipe cross. The invention is useful in connection with and will be described with reference to connections of a sight gauge such as may be used in boilers or tanks.

It is common practice to indicate the level of a liquid within a tank by means of a sight gauge which includes a transparent tube having its two ends connected to the tank at regions above and below the limits of liquid level to be indicated. It has been more or less common practice to provide this sight gauge with a pair of three-way cocks located in position to permit access to the transparent tube for cleaning or repairs. The three-way cocks referred to have the disadvantage that it is not possible to push a cleaning rod through the cock, so that the cleaning operation cannot be performed with the minimum of time and trouble.

An object of the present invention is to provide a sight tube connection for a tank in which a pair of pipe crosses are utilized at each end of the sight tube, whereby the matter of cleaning will be facilitated.

A further object is to provide novel locking caps for the closures of said pipe crosses whereby said closures may be effectively locked against unauthorized removal.

A further object is to provide a set of locking caps for the closures of pipe crosses which are simple and cheap to manufacture and also simple and effective in operation.

Further objects will appear as the description proceeds.

Referring to the drawing—

Figure 1 is a view, parts being broken away, showing a tank having sight gauge means cooperatively associated therewith, which sight gauge means have combined therewith one embodiment of the present invention;

Figure 2 is a view on an enlarged scale of part of the structure shown in Figure 1;

Figures 3 and 4 are views in front elevation and side elevation, respectively, of a locking cap forming part of the present invention; and Figures 5 and 6 are views in front elevation and side elevation, respectively, of another cap adapted to mate with the cap illustrated in Figures 3 and 4.

The numeral 10 indicates a tank and the numeral 11 indicates a transparent tube connected to the top and bottom of said tank through the tubes 12 and 13, respectively. A scale 11A is provided fixedly mounted relative to said tube 11. The two extremities of the transparent tube 11 are seated within the two pipe fittings 14—14, which for the purposes of description are referred to in this specification as pipe crosses. Such fittings are well known commercially and include the four radially projecting arms 15—15, which in the illustrated embodiment are externally screw-threaded. Located between the pipe 12 at the top of the tank and the upper pipe cross 14 is the stop cock 16, and located between the pipe 13 at the bottom of the tank and the lower pipe cross 14 is the stop cock 17. The packing around the extremities of this transparent tube 11 may be held in operative position by means of the nuts 18.

The two outstanding arms 15—15 other than those connected to the tube 11 and to the tank 10 are provided with closures 19—19, which take the form of nuts threaded upon said arms 15—15.

The numeral 20 indicates a cap having a substantially symmetrical bore 21 adapted to fit rather closely over one of the closures 19. The numeral 22 indicates a cooperating cap having a substantially cylindrical bore 23 adapted to fit rather closely over the other of the closures 19. The nut 20 has the outstanding flange 24 disposed in a radial plane with respect to the bore 21 of the cap 20. Said flange 24 has therein the aperture 25.

The cap 22 has extending from one side thereof the loop 26 including the spaced side walls 27—27 and the junction portion 28. The loop 26 provides an aperture for receiving the flange 24 of the cap 20. The side walls 27—27 and said loop 26 are provided with the aligned apertures 29 adapted to line up with the aperture 25 in the cap 20.

In locking the closures 19—19 in place upon either one of the pipe crosses 15—15, the cap 20 will be pushed over one of the closures 19. If the fit of the closure 19 is sufficiently close within the cap 20, said cap may hold itself in position while the locking cap 22 is being inserted over the other of the closures 19. In any case it is a simple matter to hold the cap 20 in place on the closure 19 while the other locking cap 22 is pushed over the other closure 19 with the flange 24 of cap 20 being received within the loop 26. Due to the snug fit which the caps 20 and 22 have with their respective closures 19—19, and/or due to the interfitting relationship between the flange 24 and the loop 26, said caps 20 and 22 will be held in their positions upon the closures 19—19. A hasp of the padlock 30 may now be inserted through the aligned apertures 25 and 29—29, so that unauthorized removal of said caps is effectually prevented. It will be understood, of course, that a duplicate set of caps may be used at the other end of the tube 11.

It will be understood that when it is intended to repair or clean the sight tube, the stop cocks 16 and 17 will be turned to prevent flow of liquid or gas through the pipes 12 and 13 toward said sight tube. After the padlocks 30—30 have been removed, the cap 22 may be drawn off its cooperating closure 19, after which the cap 20 may be drawn off its closure 19. Said closures 19—19 may then be turned off the corresponding pipe cross 14. It is readily possible to insert a cleaning rod through the tube 11 and, when it is feasible to open stop cocks 16 and 17, also through the pipes 12 and 13.

Though a preferred embodiment of the present invention has been described in detail, many modifications will occur to those skilled in the art. It is intended to cover all such modifications that fall within the scope of the appended claims.

What is claimed is—

1. In combination, a pipe cross having four radial arms, closures for two of said arms and a pair of caps fitting said closures, one of said caps having a projecting flange, the other of said caps having a projecting loop, said flange being adapted to fit within said loop.

2. In combination, a pipe cross having four radial arms, closures for two of said arms and a pair of caps fitting said closures, one of said caps having a projecting flange, the other of said caps having a projecting loop, said flange being adapted to fit within said loop, said loop and flange having apertures adapted to be lined up with one another when said caps are in position upon said closures.

3. In combination, a pipe cross having four radial arms, closures for two of said arms and a pair of caps fitting said closures, one of said caps having a projecting flange, the other of said caps having a projecting loop, said flange being adapted to fit within said loop, said loop and flange having apertures adapted to be lined up with one another when said caps are in position upon said closures, and a removable locking member extending through said aligned apertures.

4. In combination, a pipe cross having four radial arms, closures for two adjacent arms of said four arms, means for preventing the unauthorized removal of said closures, said means comprising a pair of members fitting said closures, one of said members having a projecting flange, the other of said members having a portion for receiving said flange, and a removable locking member for cooperating with said flange and said receiving means to lock same together.

WILFRED C. SCHOFIELD.